US008341686B2

(12) United States Patent
Hale et al.

(10) Patent No.: US 8,341,686 B2
(45) Date of Patent: Dec. 25, 2012

(54) BACKUP AND RESTORE OF NETWORK CONFIGURATION DATA USING A REMOTE CONTROLLER DEVICE

(75) Inventors: Nathan Hale, Denver, CO (US); David A. Innes, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 291 days.

(21) Appl. No.: 12/795,393

(22) Filed: Jun. 7, 2010

(65) Prior Publication Data

US 2011/0302619 A1 Dec. 8, 2011

(51) Int. Cl.
*H04N 7/173* (2006.01)
*H04N 7/16* (2011.01)

(52) U.S. Cl. ......... 725/133; 725/141; 725/153; 348/734

(58) Field of Classification Search .................. 348/734; 725/110, 133, 141, 153

See application file for complete search history.

(56) References Cited

U.S. PATENT DOCUMENTS 4,959,810 A 9/1990 Darbee et al.
5,115,236 A 5/1992 Kohler
5,228,077 A 7/1993 Darbee
5,255,313 A 10/1993 Darbee
5,386,251 A 1/1995 Movshovich
5,414,761 A 5/1995 Darbee
5,552,917 A 9/1996 Darbee et al.
5,629,868 A 5/1997 Tesseir et al.
5,689,353 A 11/1997 Darbee et al.
5,781,784 A 7/1998 McKinley
5,963,624 A 10/1999 Pope
6,255,961 B1 7/2001 Van Ryzin et al.
6,404,779 B1 6/2002 Silvers
6,532,592 B1 3/2003 Shintani et al.
6,545,587 B1 * 4/2003 Hatakeyama et al. ....... 340/3.31
6,956,496 B1 10/2005 Herz
7,009,528 B2 3/2006 Griep
7,046,161 B2 5/2006 Hayes (Continued)

FOREIGN PATENT DOCUMENTS

JP 2002058080 A 2/2002

(Continued)

OTHER PUBLICATIONS

International Search Report and Written Opinion mailed Dec. 22, 2008 for International Application No. PCT/US2007/088871, filed Dec. 27, 2007.

*Primary Examiner* — Hunter B Lonsberry

(74) *Attorney, Agent, or Firm* — Ingrassia Fisher & Lorenz, P.C.

(57) ABSTRACT

Presented here is a method of operating video services receivers in a network that includes a controller device and at least one member device. Also presented is a controller device that facilitates the method. The method obtains network configuration data at a first video services receiver, where the network configuration data is utilized by the first video services receiver to support data communication with the controller device and the at least one member device. The method continues by establishing a data communication link between the first video services receiver and the controller device, and uploading the network configuration data from the first video services receiver to the controller device via the data communication link. The controller device can thereafter be used to download the network configuration data to a second video services receiver.

13 Claims, 3 Drawing Sheets

U.S. PATENT DOCUMENTS

| | | | | |
|---|---|---|---|---|
| 7,046,163 | B2 | 5/2006 | Macey | |
| 7,093,003 | B2 | 8/2006 | Yuh et al. | |
| 7,119,710 | B2 | 10/2006 | Hayes et al. | |
| 7,167,913 | B2 | 1/2007 | Chambers | |
| 7,218,243 | B2 | 5/2007 | Hayes et al. | |
| 7,221,285 | B1 | 5/2007 | Hamilton | |
| 2005/0155081 | A1 | 7/2005 | Chiou | |
| 2006/0041655 | A1 | 2/2006 | Holloway et al. | |
| 2006/0048194 | A1 * | 3/2006 | Poslinski | 725/81 |
| 2008/0158003 | A1 | 7/2008 | Linebarger et al. | |

FOREIGN PATENT DOCUMENTS

| | | | |
|---|---|---|---|
| KR | 20060020109 | A | 3/2006 |
| WO | 03103290 | A | 12/2003 |

* cited by examiner

BACKUP AND RESTORE OF NETWORK CONFIGURATION DATA USING A REMOTE CONTROLLER DEVICE

TECHNICAL FIELD

Embodiments of the subject matter described herein relate generally to the configuration and operation of networks of electronic devices such as a network that includes at least one video services receiver and at least one related remote control device. More particularly, embodiments of the subject matter relate to the use of a remote control device to backup network configuration data used by a video services receiver.

BACKGROUND

Most television viewers now receive their video signals through a content aggregator such as a cable or satellite television provider. Digital video broadcasting (DVB) systems, such as satellite systems, are generally known. A DVB system that delivers video service to a home will usually include a video services receiver component or device, which is commonly known as a set-top box (STB). In the typical instance, encoded television signals are sent via a cable or wireless data link to the viewer's home, where the signals are ultimately decoded in the STB. The decoded signals can then be viewed on a television or other appropriate display as desired by the viewer. The viewer can remotely control the STB using an appropriate controller device, such as a compatible remote control device.

Some customer sites will include more than one STB and, therefore, more than one remote control device. The STBs and the remote control devices may cooperate and communicate using data network technology, techniques, and architectures. In this regard, the complexity of the network, the manner in which the network devices communicate, and the amount of interaction between the network devices will depend upon various factors, such as the number of deployed STBs, the number of deployed remote control devices, and the number of televisions and monitors supported by the STBs. For example, one STB could be controlled with only one designated remote control device or with any number of different remote control devices. As another example, one remote control device might be configured to control only one STB, a plurality of different STBs, any number of television, monitor, or other electronic devices, etc.

After deployment and installation at the customer site, an STB can be initialized and configured in accordance with the desired network arrangement. Thus, the STB will maintain data (sometimes referred to as network configuration data) that describes, defines, or specifies certain parameters, settings, preferences, and/or options that are utilized to support operation of the network. Consequently, if the STB is subsequently replaced (due to upgrading, enhancement, repair, or otherwise), the new STB must be set up and configured for equivalent operation in the existing network topology. For example, it may be necessary for the user to manually re-link all of their remote control devices to the new STB. This procedure can be time consuming, frustrating, and difficult for some customers, especially for complicated network arrangements where the site includes many STBs and/or many remote control devices.

Accordingly, it is desirable to have techniques, technology, network devices, and related operating methods that address the shortcomings of traditional network architectures. In addition, it is desirable to have solutions or approaches make it easier and more convenient to set up, initialize, and configure a STB that is introduced into a network that includes at least one remote control device and/or at least one other STB. Furthermore, other desirable features and characteristics will become apparent from the subsequent detailed description and the appended claims, taken in conjunction with the accompanying drawings and the foregoing technical field and background.

BRIEF SUMMARY

A method of configuring a video services receiver for operation in a network is presented here. The method begins by establishing a data communication link between the video services receiver and a controller device that is a member device of the network. The method continues by downloading network configuration data from the controller device to the video services receiver device via the data communication link. The network configuration data is utilized by the video services receiver to support data communication with at least one member device of the network.

A controller device for video services receivers that operate in a network is also presented here. The controller device includes a receiver component, a memory element, and a transmitter component. The receiver component is configured to receive network configuration data that is utilized by a first video services receiver to support data communication with at least one member device of the network. The memory element is configured to store the network configuration data received by the receiver component, resulting in stored network configuration data. The transmitter component is configured to transmit the stored network configuration data to a second video services receiver. The stored network configuration data is utilized by the second video services receiver to support data communication with the at least one member device of the network.

Also presented is a method of operating video services receivers in a network that includes a controller device and at least one member device. The method obtains network configuration data at a first video services receiver, the network configuration data utilized by the first video services receiver to support data communication with the controller device and the at least one member device. The method continues by establishing a data communication link between the first video services receiver and the controller device. The method uploads the network configuration data from the first video services receiver to the controller device via the data communication link.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
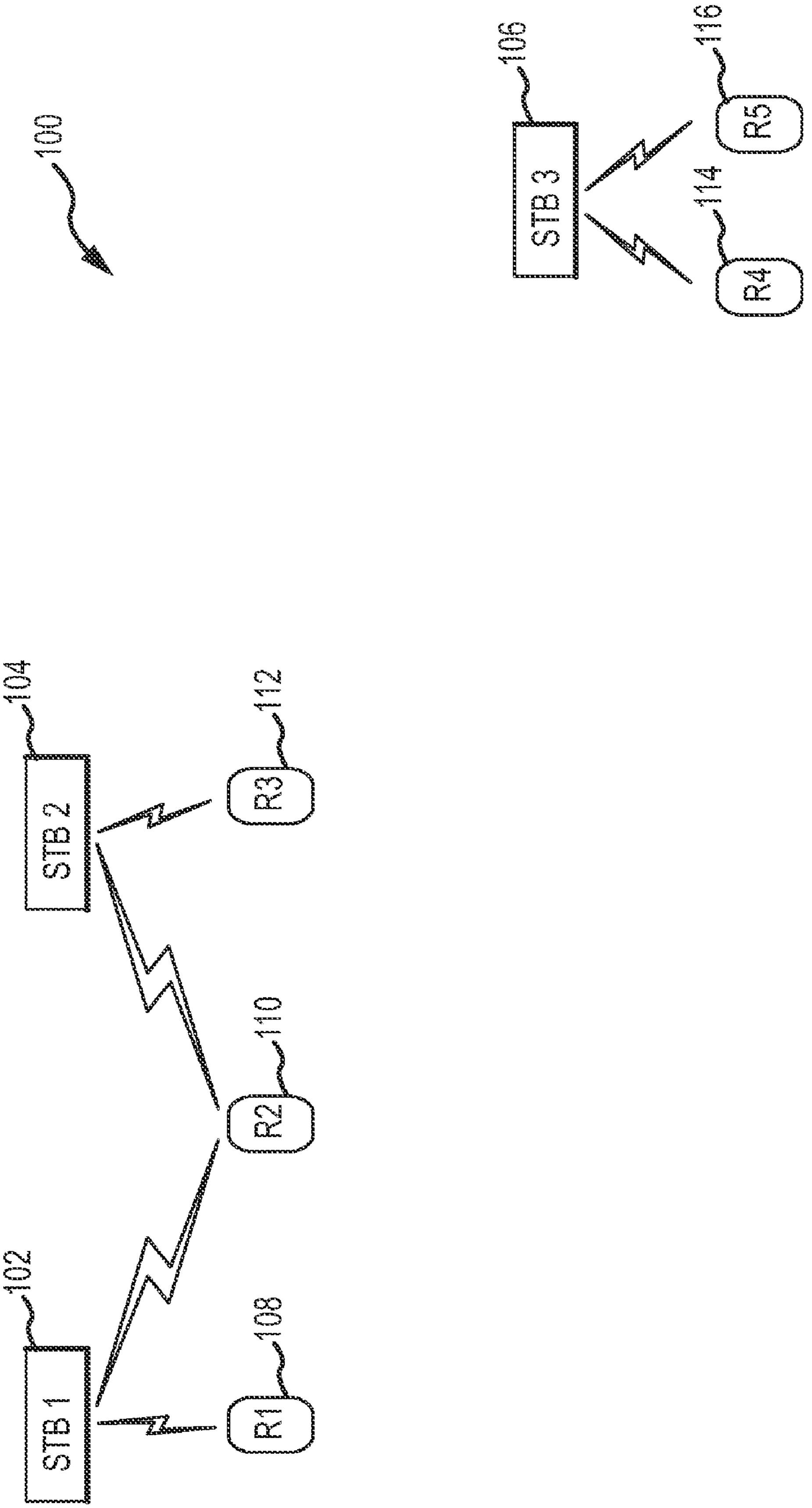
FIG. 1 is a schematic representation of an exemplary embodiment of a network that includes video services receivers and controller devices.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. Moreover, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The techniques and technology described herein can be employed in the context of a network of devices that includes at least one controlled device and at least one controller device, where the controlled device and the controller device communicate with one another, and where the controller device controls at least one function, operation, or feature of the controlled device. Although the particular device platforms and device functionality need not be restricted or limited in any way, the exemplary embodiment described here relates to a network of devices associated with a video delivery system such as a cable television system, a satellite television system, a computer-based content delivery system, or the like. In this regard, the disclosed subject matter relates to certain features and functions of a video services receiver (such as an STB) and to certain features and functions of a compatible remote control device. In particular, the remote control device is used to back up and store certain network configuration data that is normally stored at and utilized by the STB. The backed up network configuration data can then be downloaded to the same STB and/or to a new or replacement STB as needed. Thereafter, the new STB can save the network configuration data and configure itself for operation in the network with little to no user interaction or manual intervention.

Turning now to the drawings, FIG. 1 is a schematic representation of an exemplary embodiment of a network 100 that includes video services receivers (STBs) and compatible controller devices. The network 100 includes a first STB 102, a second STB 104, a third STB 106, a first controller device 108, a second controller device 110, a third controller device 112, a fourth controller device 114, and a fifth controller device 116. It should be appreciated that the number of STBs and/or the number of controller devices in a deployed embodiment could vary from that depicted in FIG. 1. Moreover, the network 100 could include other compatible member devices, components, or elements if so desired. In this regard, the network 100 could include one or more of the following, without limitation: a network compatible television set or monitor; a network compatible home theater receiver; a laptop, desktop, or other type of computer; a digital media server; a video game console; or the like.

For this example, the first controller device 108 is capable of controlling only the first STB 102, and it has no effect on the operation of the second STB 104 or the third STB 106. The second controller device 110, however, is capable of controlling the first STB 102 and the second STB 104, but not the third STB 106. For this example, the third controller device 112 only controls the second STB 104. Moreover, the third STB 106 can be controlled using either the fourth controller device 114 or the fifth controller device 116 (these two controller devices, however, are not capable of controlling any other STB in the network 100).

FIG. 1 depicts a typical deployment where the controller devices wirelessly communicate with the STBs. In practice, however, any given controller device could be suitably configured to communicate with its respective STB using a tangible data communication link such as a cable arrangement. Moreover, a controller device could support both wireless and tangible data communication with an STB if so desired. This description assumes that each controller device 108, 110, 112, 114, 116 is realized as a wireless handheld remote control device of the type that is typically provided with cable television STBs, satellite television STBs, home entertainment systems, etc. Alternatively, a controller device could be realized as, incorporated into, or combined with a device, appliance, component, or system that is suitably configured to support network data communication with an STB. In this regard, the controller device functionality and features described here could be resident in any of the following, without limitation: a wireless telephone; a video game controller; a digital media player; a home network controller; a home appliance; a computer; a clock radio; or any suitably configured electronic device.

Although not depicted in FIG. 1, any two of the STBs 102, 104, 106 could be configured to support data communication therebetween. For example, the first STB 102 could support data communication with the second STB 104 in accordance with the data communication protocols and methodologies used throughout the network 100. If supported, STB-to-STB data communication could be performed using wireless data communication links and/or tangible data communication links (as described above for the controller devices).

The exemplary embodiment of the network 100 described here employs a network addressing scheme that identifies network nodes (i.e., member devices of the network 100) and accommodates pairing or linking of STBs to their corresponding controller devices. In accordance with this scheme, each node in the network 100 (i.e., each STB and each controller device) has an address or other identifier that is unique within the network 100. Accordingly, each STB can learn and store the network address of its linked controller devices. For example, the first STB 102 is paired with the first controller device 108 and with the second controller device 110 and, therefore, the first STB 102 will have knowledge of the network addresses of the first and second controller devices 108, 110. Similarly, the second STB 104 will have knowledge of the network addresses of the second and third controller devices 110, 112, and the third STB 106 will have knowledge of the network addresses of the fourth and fifth controller devices 114, 116. In certain implementations, the network 100 utilizes Media Access Control (MAC) addresses to identify the STBs and the controller devices, although other addressing schemes such as Internet Protocol (IP) addresses or Personal Area Network (PAN) IDs could be used.

For this particular example, network addresses are considered to be one type of network configuration data that is utilized by the STBs in the network 100. In practice, an STB in the network 100 may need to maintain and utilize network configuration data to support data communication with at least one other member device of the network 100. Thus, the network configuration data maintained by an STB may include data associated with one or more remote control devices paired with that STB, data associated with at least one other STB that operates in the network 100, and/or data associated with the network 100 (e.g., data related to the network arrangement, network architecture, network topology, network operating requirements, supported data communication protocols, and the like). Generally speaking, the network configuration data describes, defines, specifies, or otherwise indicates, without limitation: the device topology of the network 100; the member devices within the network 100; the data communication protocols, technologies, and techniques supported by the STB; and wireless frequencies or channels supported by the STB for purposes of network communication. In this regard, the network configuration data might contain the address information of other devices in the network, which may be the "long" form of the address (e.g., the MAC address itself) or it may be a "short" address that is agreed upon by the devices when they communicate at the time that they are linked. The network configuration data can also include certain configuration information specific to a particular remote device. In certain implementations, for example, the network configuration data includes a user-generated "name" for the remote. Another piece of network configuration data is a "device ID" that is basically an index into a look-up table containing most of the other information for a specific remote device. Thus, the system need not store the complete address of the remote controller (instead, it can store just the device ID, which should be sufficient to enable the RF communications stack to determine which remote controller device to communicate with). Accordingly, an STB with knowledge of the appropriate network configuration data will be able to cooperate with the other member devices in the network 100 in the desired manner. Conversely, if an STB is lacking some or all of the necessary network configuration data, then it will be difficult or impossible for that STB to function properly or as expected in the context of the network 100.

Notably, the network configuration data usually changes when the topology of the network 100 changes. In this regard, the network topology changes when an existing member device is removed, when a new member device is added, or when an existing member device is replaced. For this reason, when an existing STB is replaced, the replacement STB must be provided with the same network configuration data that had been maintained by the old STB. Although the network configuration data could be manually provided or the replacement STB could be otherwise programmed, those procedures can be time consuming, confusing for the user, or overly complicated for some users. The approach described in more detail below provides a quick and easy way to set up and program a replacement (or new) STB with some or all of the necessary network configuration data.

Figure 2:
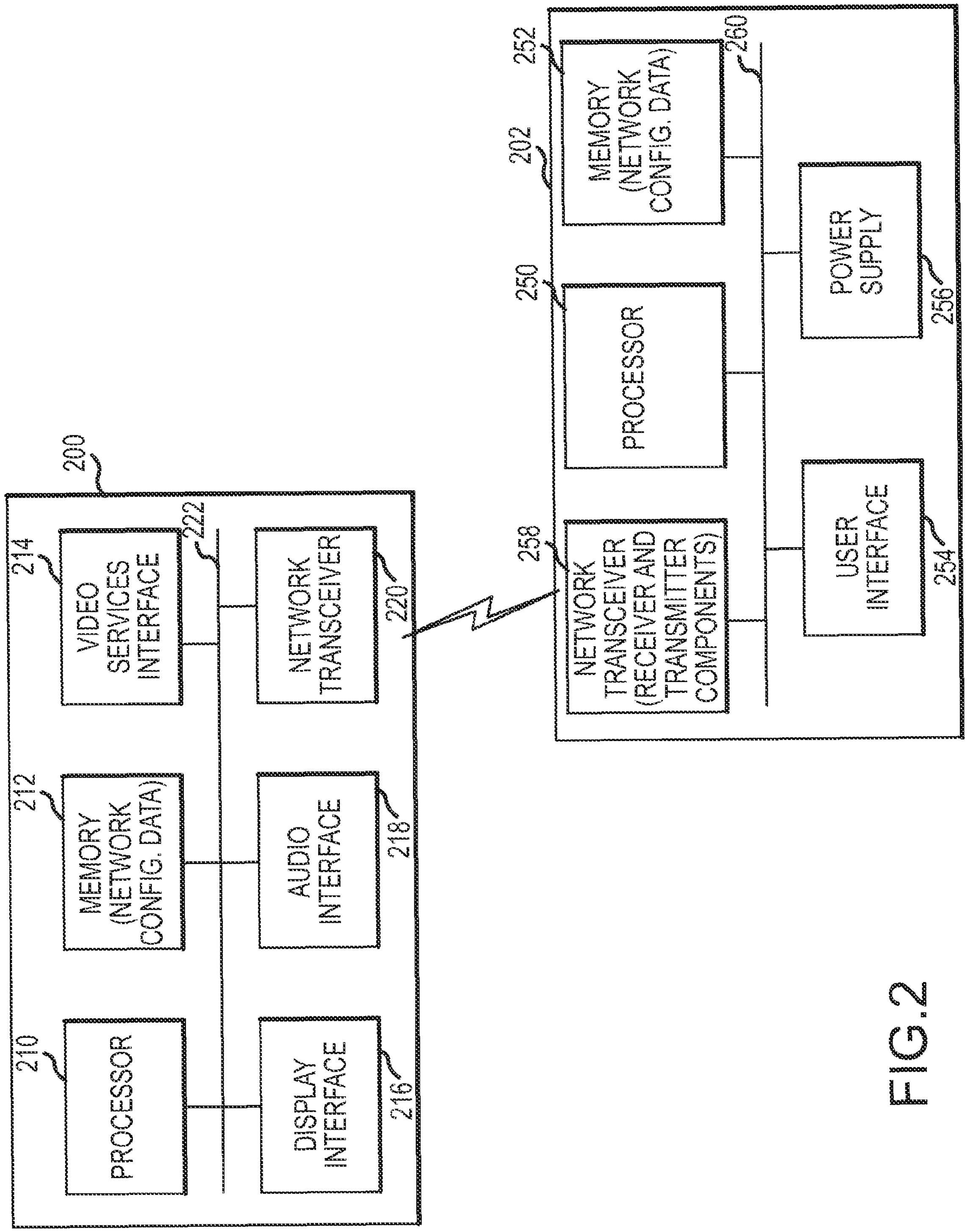
FIG. 2 is a block diagram that illustrates an exemplary embodiment of a video services receiver and an exemplary embodiment of a controller device.

FIG. 2 is a block diagram that illustrates an exemplary embodiment of a video services receiver 200 and an exemplary embodiment of a controller device 202. The video services receiver 200 could be used for any of the STBs depicted in FIG. 1, and the controller device 202 could be used for any of the controller devices depicted in FIG. 1. The video services receiver 200 is configured to receive video content, and to provide the video content to an appropriate display for viewing by a customer or user. This illustrated embodiment of the video services receiver 200 generally includes, without limitation: at least one processor 210; at least one memory element 212; a video services interface 214; a display interface 216 for the display; an audio interface 218; and a network transceiver 220 (e.g., a remote control transceiver). These components and elements may be coupled together as needed for purposes of interaction and communication using, for example, an appropriate interconnect arrangement or architecture 222. It should be appreciated that a practical implementation of the video services receiver 200 will include additional elements and features that support conventional functions and operations, e.g., a power supply, video processing elements, and the like.

The processor 210 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 210 may be realized as a microprocessor, a controller, a microcontroller, or a state machine. Moreover, the processor 210 may be implemented as a combination of computing devices, e.g., a combination of a digital signal processor and a microprocessor, a plurality of microprocessors, one or more microprocessors in conjunction with a digital signal processor core, or any other such configuration.

The memory element 212 may be realized as RAM memory, flash memory, EPROM memory, EEPROM memory, registers, a hard disk, a removable disk, or any other form of storage medium known in the art. In certain embodiments, the memory element 212 includes or is realized as a hard disk, which may also be used to support integrated digital video recorder (DVR) functions of the video services receiver 200. The memory element 212 can be coupled to the processor 210 such that the processor 210 can read information from, and write information to, the memory element 212. In the alternative, the memory element 212 may be integral to the processor 210. As an example, the processor 210 and the memory element 212 may reside in a suitably designed ASIC. As depicted in FIG. 2, the memory element 212 may be used to store and maintain network configuration data that is utilized by the video services receiver 200 within the context of its particular network. Moreover, the memory element 212 could be used to store other data as needed for operation of the video services receiver 200.

For a satellite video system, the video services interface 214 is coupled to the customer's satellite antenna, and the video services interface 214 is suitably configured to receive and perform front end processing on signals transmitted by satellite transponders. In this regard, the video services interface 214 can receive data associated with any number of services, including data that is used to present video programming, populate on-screen menus, graphical user interfaces (GUIs), interactive programming interfaces, etc. The video services interface 214 may leverage conventional design concepts that need not be described in detail here.

The display interface 216 is coupled to one or more display elements (not shown) at the customer site. The display interface 216 represents the hardware, software, firmware, and processing logic that is utilized to render graphics, images, video, and other visual indicia on the customer's display. For example, the display interface 216 is capable of providing video programming, graphical interactive programming interfaces for video services, interactive graphical menus, and other GUIs for display to the user. The display interface 216 may leverage conventional design concepts that need not be described in detail here.

The audio interface 218 is coupled to one or more audio system components (not shown) at the customer site. The audio interface 218 represents the hardware, software, firmware, and processing logic that is utilized to generate and provide audio signals associated with the operation of the video services receiver 200. Depending upon the particular embodiment, the audio interface 218 may be tangibly or wirelessly connected to the audio portion of a television or monitor device, or it may be tangibly or wirelessly connected to a sound system component that cooperates with the television or monitor device.

The network transceiver 220 performs wireless and/or wired data communication with one or more compatible remote devices, such as the controller device 202, a portable computer, an appropriately equipped mobile telephone, or the like. The network transceiver 220 enables the user to remotely control various functions of the video services receiver 200, in accordance with well known techniques and technologies. In certain embodiments, the network transceiver 220 is also used to upload network configuration data to the controller device 202 and/or to receive downloaded network configuration data from the controller device 202 (or from another controller device), as described in more detail below.

The controller device 202 can be used to control the operation of the video services receiver 200 and possibly other member devices in its network. The illustrated embodiment of the controller device 202 generally includes, without limitation: at least one processor 250; at least one memory element 252; a user interface 254; a power supply 256 such as a battery or a battery pack; and a network transceiver 258 (which includes or cooperates with a receiver component and a transmitter component). The components and elements of the controller device 202 may be coupled together as needed for purposes of interaction and communication using, for example, an appropriate interconnect arrangement or architecture 260. It should be appreciated that a practical implementation of the controller device 202 will include additional elements and features that support conventional functions and operations.

The processor 250 may be implemented or realized in the manner described above for the processor 210, but suitably configured to perform the controller device functions described here. Likewise, the memory element 252 may be implemented as described above for the memory element 212. Notably, the memory element 252 stores uploaded network configuration data for at least one video services receiver, such that the controller device 202 can serve as a backup and restore device for the network configuration data.

The user interface 254 may include one or more elements, components, or features that accommodate user inputs and/or that provide feedback to the user. For example, the user interface 254 may include, without limitation: keys; buttons; switches; knobs; a keyboard; a touchpad; a touch screen; a mouse or equivalent pointing device; indicator lights; a speaker or other sound transducer; a microphone; or the like. In certain embodiments, the user can manipulate the user interface 254 to initiate the uploading of network configuration data to the controller device 202 and/or to initiate the downloading of network configuration data from the controller device 202.

The network transceiver 258 performs wireless and/or wired data communication with one or more compatible devices, such as the video services receiver 200. The network transceiver 258 is primarily used to send control commands (e.g., "channel up" commands, "channel down" commands, "volume up" commands, "menu select" commands, and the like) from the controller device 202 to the video services receiver 200, as is well understood. In certain embodiments, the network transceiver 258 is also used to receive and transmit network configuration data between the controller device 202 and a video services receiver. Accordingly, the network transceiver 258 includes or cooperates with a receiver component that is suitably configured to receive network configuration data that is also maintained at the video services receiver 200. The network transceiver 258 also includes or cooperates with a transmitter component that is suitably configured to transmit network configuration data (that is stored in the memory element 252) to the video services receiver 200 and/or to any number of other video services receivers in the network.

The network transceivers 220, 258 can be suitably configured to support one or more wireless or wired data communication protocols. In preferred embodiments, the network transceivers 220, 258 support wireless data communication protocols and techniques such as, without limitation: RF; Bluetooth; ZigBee/RF4CE (and other variants of the IEEE 802.15.4 protocol); IEEE 802.11 (any variation); IEEE 802.16 (WiMAX or any other variation); cellular/wireless/cordless telecommunication protocols; Synkro; Control4; proprietary wireless data communication protocols; and proprietary wired data communication protocols.

Figure 3:
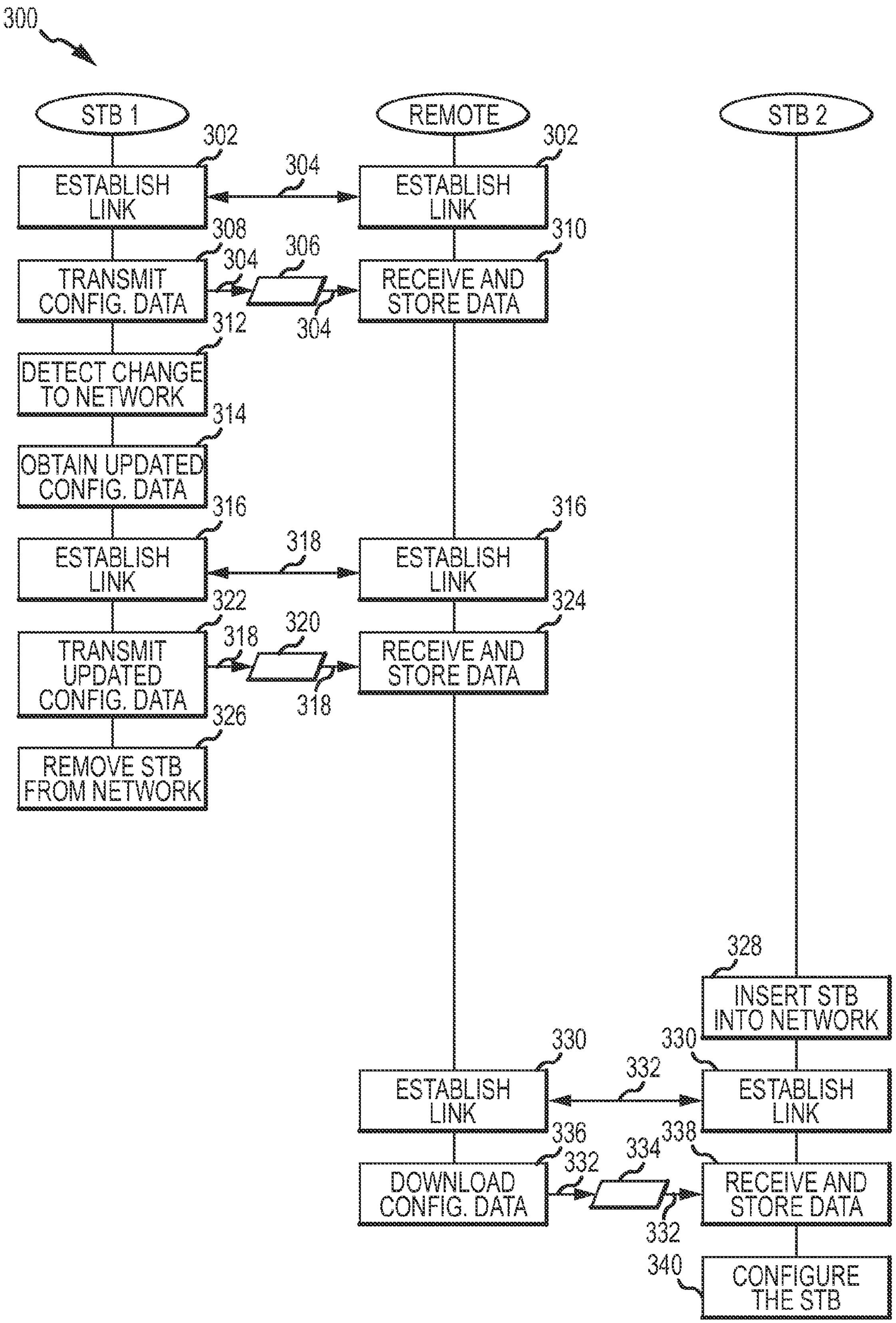
FIG. 3 is a flow diagram that illustrates an exemplary process for configuring a video services receiver with backed up network configuration data.

FIG. 3 is a flow diagram that illustrates an exemplary process 300 for configuring a video services receiver with backed up network configuration data. The various tasks performed in connection with the process 300 may be performed by software, hardware, firmware, or any combination thereof. For illustrative purposes, the following description of the process 300 may refer to elements mentioned above in connection with FIGS. 1 and 2. In practice, portions of the process 300 may be performed by different elements of the described system, e.g., an STB, a remote control device, an audio system component, or the like. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

For ease of description, FIG. 3 corresponds to a simple example that contemplates interaction between three member devices of the same network: a first STB (labeled STB 1 in FIG. 3); a remote control device (labeled REMOTE in FIG. 3); and a second STB (labeled STB 2 in FIG. 3). Other devices in the network, such as additional remote control devices, are not shown in FIG. 3. In this regard, tasks performed by or otherwise associated with the first STB are vertically aligned with the "STB 1" label, tasks performed by or otherwise associated with the remote control device are vertically aligned with the "REMOTE" label, and tasks performed by or otherwise associated with the second STB are vertically aligned with the "STB 2" label. The arrangement shown in FIG. 3 is not limiting and, indeed, a practical implementation will typically include more devices than only one STB (which is replaced) and only one compatible remote control device, as explained above with reference to FIG. 1. It should be appreciated that the concepts presented here can be extended for use with other network arrangements and other scenarios.

The process 300 assumes that the first STB and the remote control device are already present in the network and have already been initialized and paired together for data communication within the network. The process 300 also assumes that the first STB has already obtained the network configuration data that it utilizes to support data communication with the remote control device and/or at least one other member device of the network (such as additional remote control devices). In practice, the first STB could obtain the network configuration data by communicating with one or more of the network member devices, by interacting with the user, via an online server or other data source, during a configuration or programming process at the vendor or manufacturer, or the like.

The process 300 may begin by establishing a data communication link between the first STB and the remote control device (task 302). The data communication link 304 may include a wireless link and/or a tangible link, as mentioned previously. This initial data communication link 304 can be used to upload network configuration data 306 from the first STB to the remote control device. For the uploading operation, the first STB transmits its network configuration data 306 (task 308) to the remote control device, which receives and stores the network configuration data 306 (task 310) in its onboard memory element (see FIG. 2). The stored network configuration data 306 represents a backed up version of the same data maintained at the first STB. In practice, the uploading procedure (namely, tasks 302, 308, and 310) might be performed automatically when the first STB is powered up, periodically at certain scheduled times, and/or at the request of the user. For example, the user might be able to initiate the uploading procedure by manipulating the remote control device. As another example, the first STB could automatically initiate the uploading procedure during “idle” periods, such as overnight.

During normal and routine operation of the first STB and the remote control device, the stored network configuration data is maintained at the remote control device until needed. It should be appreciated that the network configuration data is influenced by the current network topology, the pairing of member devices in the network, the number devices in the network, etc. Thus, currently stored network configuration data could become outdated or ineffective if the network topology or architecture is altered. Accordingly, the first STB and/or the remote control device may be capable of detecting changes to the network topology or architecture, or the user could initiate an update of the stored network configuration data to reflect changes to the network topology.

Although not always required or necessary, the illustrated embodiment of the process 300 assumes that the first STB is capable of detecting changes in the device topology of the network. This example also assumes that the first STB actually detects a change in the network topology (task 312) at some time after the network configuration data has been stored at the remote control device. Such a change may represent the addition of a new STB into the network, the removal of one or more previously assigned remote control devices from the network, a rearrangement of the devices or topology of the network, etc. When the first STB detects the change, it will “refresh” its network configuration data if necessary (by communicating with one or more of the network member devices, by interacting with the user, via an online server or other data source, or the like). If the network configuration data has changed, then the first STB will produce or otherwise obtain updated network configuration data that reflects the change (task 314). In this regard, the updated network configuration data is influenced by the recent change in the device topology of the network.

The first STB can then upload the updated network configuration data to at least the designated remote control device by establishing a data communication link between the first STB and the remote control device (task 316). The data communication link 318 may include a wireless link and/or a tangible link, as mentioned previously. For the uploading operation, the first STB transmits its updated network configuration data 320 (task 322) to the remote control device, which receives and stores the updated network configuration data 320 (task 324) in its onboard memory element. Notably, the updated network configuration data could be uploaded to the remote control device automatically when the first STB is powered up, periodically at certain scheduled times and/or at the command of the user. Moreover, the network configuration data could be refreshed and/or updated any number of times (FIG. 3 only depicts one updating cycle for simplicity).

This example assumes that the first STB is eventually removed from the network (task 326). Task 326 may be associated with a physical and tangible removal of the first STB (which may occur if the first STB will be replaced, repaired, discarded, etc.) or a logical removal of the first STB (which may occur if the first STB is reconfigured such that it no longer operates in the network of interest). This example also assumes that the second STB is inserted or installed into the network (task 328), and that the second STB is intended as a replacement or redundant instantiation of the first STB. Accordingly, the remote control device is intended to operate as a controller device for both the first STB and the second STB. It should be appreciated that the second STB might be a repaired, enhanced, or upgraded version of the first STB. In other words, the first and second STBs could be the same physical component that has been removed from and subsequently reinserted into the network.

After the second STB has been physically installed at the customer site and powered up, it can ready itself to receive the current version of the network configuration data stored at the remote control device. The downloading of the network configuration data from the remote control device to the second STB may be initiated in any number of different ways. For example, the downloading may be initiated at the command of the user by manipulating the user interface of the remote control device and/or the user interface of the second STB. As another example, the downloading may begin automatically when the second STB has initialized and when the second STB has determined that it does not have a current version of the network configuration data.

When the downloading operation is initialized, the remote control device can download its stored network configuration data to the second STB by establishing a data communication link between the second STB and the remote control device (task 330). The data communication link 332 may include a wireless link and/or a tangible link, as mentioned previously. For this downloading operation, the remote control device downloads its network configuration data 334 (task 336) to the second STB, which receives and stores the downloaded network configuration data 334 (task 338) in its onboard memory element. Thereafter, the second STB can process and handle the received network configuration data 334 in an appropriate manner. For example, the process 300 may configure the second STB in response to the network configuration data received from the remote control device (task 340). Configuration of the second STB in this manner may be accomplished automatically, in cooperation with the remote control device, and/or with user interaction. The process 300 is particularly useful in situations where the first STB was paired with multiple remote control devices because the downloaded network configuration data will include information related to each of those remote control devices. Thus, the second STB will be able to restore the place of all the remote control devices in the network even though it communicates with only the backup remote control device.

If task 340 successfully configures the second STB, the user need not perform any additional re-pairing or re-linking of other member devices with the second STB. Accordingly, the process 300 represents a convenient, user-friendly, and speedy methodology for deploying and programming a replacement video services receiver in an existing network topology.

The process 300 can be modified and extended to contemplate other network topologies and other backup scenarios. For example, a single remote control device could serve as the "backup remote" for a number of different STBs in the network. Moreover, it may be desirable to backup the network configuration data at more than one (possibly all) remote control device in the network. As another example, network configuration data could be exchanged between two remote control devices, thus allowing one "backup remote" to send the network configuration data to another remote control device if so desired (thereafter, the receiving remote control device can download the network configuration data to its assigned STB). These and other practical scenarios are contemplated by this foregoing description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of configuring a video services receiver for operation in a network, the method comprising:
- establishing an initial data communication link between a previously deployed video services receiver and a controller device that is a member device of the network;
- receiving, at the controller device, network configuration data from the previously deployed video services receiver via the initial data communication link;
- storing the network configuration data at the controller device, resulting in stored network configuration data;
- removing the previously deployed video services receiver from the network;
- thereafter, inserting the video services receiver into the network;
- thereafter, establishing a data communication link between the video services receiver and the controller device; and
- thereafter, downloading the stored network configuration data from the controller device to the video services receiver via the data communication link, the stored network configuration data utilized by the video services receiver to support data communication with at least one member device of the network.

2. The method of claim 1, wherein establishing the data communication link establishes a wireless data communication link between the video services receiver and the controller device.

3. The method of claim 1, wherein the controller device comprises a remote control device for the video services receiver.

4. The method of claim 3, wherein the network configuration data comprises data associated with at least one additional remote control device for the video services receiver device.

5. The method of claim 1, wherein the network configuration data comprises data associated with at least one additional video services receiver that operates in the network.

6. The method of claim 1, wherein the network configuration data comprises respective network addresses for the at least one member device of the network.

7. The method of claim 1, wherein the at least one member device of the network includes the controller device.

8. A controller device for video services receivers that operate in a network, the controller device comprising:
- a receiver component configured to receive network configuration data that is utilized by a first video services receiver to support data communication on the network;
- a memory element configured to store the network configuration data received by the receiver component, resulting in stored network configuration data; and
- a transmitter component configured to transmit the stored network configuration data to a second video services receiver, the stored network configuration data utilized by the second video services receiver to support data communication with the at least one member device of the network; wherein:
- the controller device detects changes to a network topology of the network, including a network change that represents removal of the first video services receiver from the network and addition of the second video services receiver into the network; and
- the transmitter component transmits the stored network configuration data to the second video services receiver in response to the controller device detecting the network change.

9. The controller device of claim 8, wherein the receiver component is configured to receive the network configuration data from the first video services receiver.

10. The controller device of claim 9, wherein the receiver component is configured to wirelessly receive the network configuration data from the first video services receiver.

11. The controller device of claim 8, wherein the transmitter component is configured to wirelessly transmit the stored network configuration data to the second video services receiver.

12. The controller device of claim 8, wherein the controller device comprises a remote control device for both the first video services receiver and the second video services receiver.

13. The controller device of claim 8, wherein the network configuration data comprises respective network addresses for the at least one member device of the network.

* * * * *